(12) United States Patent
Schwartz et al.

(10) Patent No.: US 11,006,642 B2
(45) Date of Patent: May 18, 2021

(54) APPARATUS AND METHOD FOR APPLYING LIQUID TO SAUSAGE

(71) Applicant: DCW CASING LLC, Mount Vernon, NY (US)

(72) Inventors: Michael Schwartz, Douglaston, NY (US); Bob Weinberg, Omaha, NE (US)

(73) Assignee: DCW CASING LLC, Mount Vernon, NY (US)

( * ) Notice: Subject to any disclaimer, the term of this patent is extended or adjusted under 35 U.S.C. 154(b) by 218 days.

(21) Appl. No.: 16/163,216

(22) Filed: Oct. 17, 2018

(65) Prior Publication Data
US 2019/0110487 A1   Apr. 18, 2019

Related U.S. Application Data

(60) Provisional application No. 62/573,228, filed on Oct. 17, 2017.

(51) Int. Cl.
| A22C 11/00 | (2006.01) |
| A22C 11/02 | (2006.01) |
| A23L 13/60 | (2016.01) |
| A23L 27/27 | (2016.01) |
| A23P 30/25 | (2016.01) |

(52) U.S. Cl.
CPC ........ *A22C 11/029* (2013.01); *A22C 11/0209* (2013.01); *A23L 13/62* (2016.08); *A23L 13/65* (2016.08); *A23L 27/27* (2016.08); *A23P 30/25* (2016.08)

(58) Field of Classification Search
CPC ............................ A22C 11/00; A22C 11/0209
USPC .......... 452/21, 27, 30–32, 35–37, 46–48, 51
See application file for complete search history.

(56) References Cited

U.S. PATENT DOCUMENTS

| 3,330,669 | A |   | 7/1967  | Hollenbeck |            |
|-----------|---|---|---------|------------|------------|
| 3,773,882 | A |   | 11/1973 | Schrenk    |            |
| 3,922,364 | A | * | 11/1975 | Townsend   | A22C 11/029 |
|           |   |   |         |            | 426/413    |
| 4,307,486 | A | * | 12/1981 | Matsumoto  | E05D 1/04  |
|           |   |   |         |            | 16/261     |

(Continued)

FOREIGN PATENT DOCUMENTS

| DE |    10357688 B3 | 2/2005 |
| DE | 202012012937 U1 | 7/2014 |

(Continued)

*Primary Examiner* — Richard T Price, Jr.
(74) *Attorney, Agent, or Firm* — Ostrager Chong Flaherty & Broitman P.C.

(57) ABSTRACT

An apparatus for co-extruding a liquid around a periphery of a stream of meat as the meat is extruded into a casing includes a collar, a tube end connected within the collar, and a co-axial stuffing tube having a proximal end connected to the tube end. The stuffing tube has concentric inner and outer layers and a longitudinal channel between the inner and outer layers extending from the proximal end of the stuffing tube to a distal end of the stuffing tube. A liquid inlet port in the collar is in fluid communication with the longitudinal channel. Methods include co-extruding the liquid from the longitudinal channel at a distal end of the stuffing tube as the stream of meat is extruded from within the inner layer of the stuffing tube such that the liquid and the meat are not combined until both are extruded into a casing.

21 Claims, 6 Drawing Sheets

(56) References Cited

U.S. PATENT DOCUMENTS

| | | | |
|---|---|---|---|
| 4,905,587 A * | 3/1990 | Smithers | A22C 11/029 425/133.1 |
| 4,940,597 A | 7/1990 | Townsend | |
| 5,686,128 A | 11/1997 | Tracy et al. | |
| 5,993,868 A | 11/1999 | Townsend | |
| 6,042,466 A * | 3/2000 | Matthews | A22C 11/029 452/45 |
| 6,235,328 B1 | 5/2001 | Morgan et al. | |
| 6,264,541 B1 * | 7/2001 | Zerbst | A22C 11/0245 452/27 |
| 6,283,846 B1 * | 9/2001 | Townsend | A22C 11/029 452/27 |
| 6,641,475 B1 * | 11/2003 | Nielsen | A22B 5/0094 452/109 |
| 6,733,812 B2 | 5/2004 | Franklin et al. | |
| 6,740,349 B2 * | 5/2004 | Franklin | A22C 11/001 426/277 |
| 6,988,943 B2 * | 1/2006 | Reutter | A22C 13/0003 452/40 |
| 8,286,549 B2 | 10/2012 | Auf Der Heide et al. | |
| 8,944,798 B2 | 2/2015 | Gimmler et al. | |
| 8,945,643 B2 | 2/2015 | Carlson et al. | |
| 2004/0033773 A1 * | 2/2004 | van den Nieuwelaar | A22C 17/04 452/138 |
| 2009/0023373 A1 * | 1/2009 | Bachtle | A22C 11/0209 452/33 |
| 2012/0295005 A1 * | 11/2012 | Kleckner | A23L 13/428 426/574 |
| 2012/0321752 A1 * | 12/2012 | Van De Nieuwelaar | A22C 13/0006 426/105 |
| 2014/0170945 A1 * | 6/2014 | Bachtle | A22C 11/02 452/32 |
| 2014/0212558 A1 * | 7/2014 | Spierts | A22C 11/02 426/513 |

FOREIGN PATENT DOCUMENTS

| | | |
|---|---|---|
| EP | 0882403 A2 | 9/1998 |
| EP | 0882403 A3 | 12/1998 |
| EP | 1581429 B1 | 12/2003 |
| FR | 2723292 | 8/1995 |

* cited by examiner

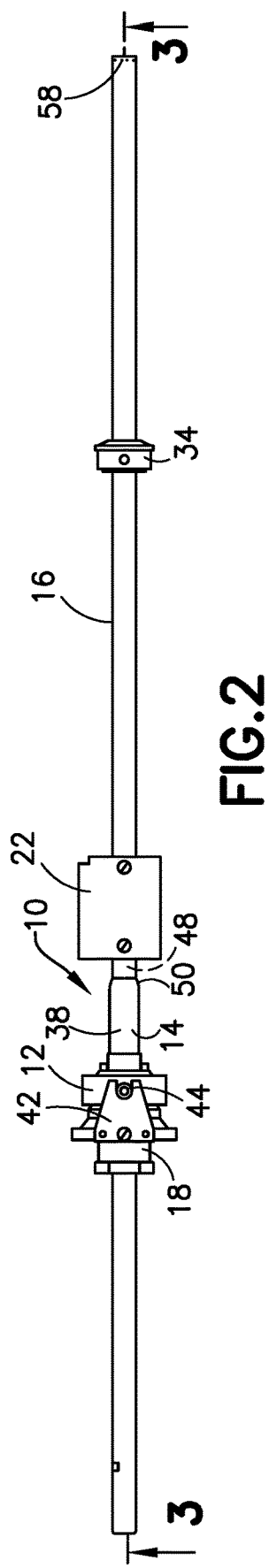
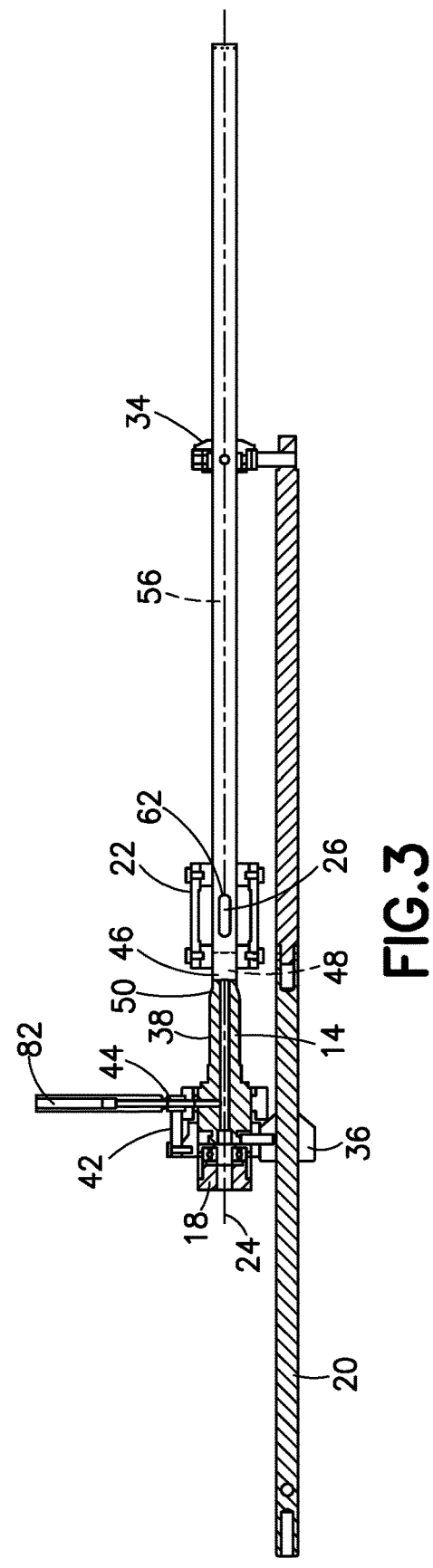

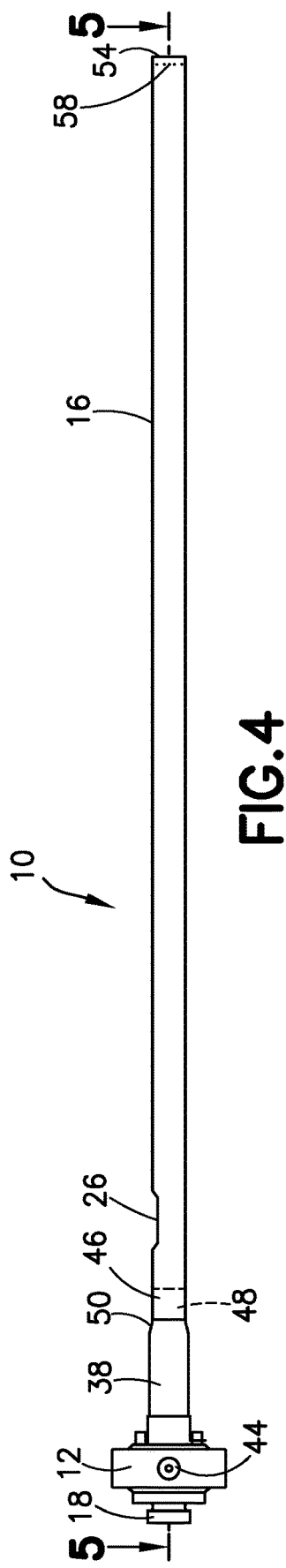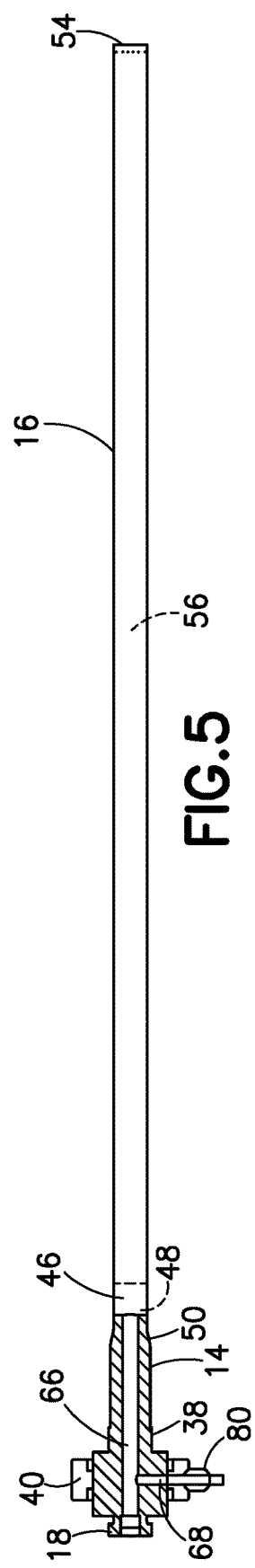

APPARATUS AND METHOD FOR APPLYING LIQUID TO SAUSAGE

RELATED APPLICATION

This application claims priority U.S. provisional patent application No. 62/573,228 filed Oct. 17, 2017, the disclosure of which is incorporated herein by reference thereto.

TECHNICAL FIELD

This disclosure relates generally to sausage stuffing equipment and, more particularly, to an apparatus and method for applying a thin layer of liquid around a stream of meat as it is being stuffed or extruded into a casing to enhance the flavor or appearance of the sausage.

BACKGROUND

The smoking of sausages has been a common practice for centuries. In the traditional method, sausages that have been stuffed in casings are hung in a room which is filled with the selected smoke (i.e., a smokehouse). The airborne chemicals in the smoke seep through the casing and into the external surface of the meat product to achieve the desired flavoring and coloring of the sausage. The traditional smoking method is a time and space consuming process.

As an alternative to the traditional smoking method, aqueous solutions containing the desired elements from natural smoke (i.e., "liquid smoke") have been produced, and sausage manufacturers often apply a liquid colorant or "liquid smoke" to the external surface of the casing after the meat product is extruded therein to provide a smoky flavor or a ring of color to make the sausage look as if it was naturally smoked. Liquid smoke has been applied to the external surface of the stuffed casing by spraying the sausages, exposing them to atomized liquid smoke, or by cascading liquid smoke over the sausages. Since most casings are permeable, the application of a liquid to the external surface allows the liquid to absorb through the surface of the casing and bleed out onto the surface of the meat product during the cooking process. However, spraying liquid smoke has disadvantages including that liquid smoke typically produces fumes and excessive waste of the liquid even though it is recycled, and liquid smoke is a relatively corrosive liquid, which can have negative impacts on occupational safety and the environment.

In view of the disadvantages of spraying liquid smoke, there have been attempts to avoid spraying, but it has generally not been feasible to blend the liquid smoke with the meat emulsion before it is stuffed into the casing because liquid smoke has a relatively low pH which is incompatible with the meat product emulsion (i.e., the meat product emulsion would break down if liquid smoke were added to it). In addition, because it is typically desired to impart a visible coloring to the sausage, an external surface treatment is what is generally desired.

It is therefore a broad object of this disclosure to overcome the shortcomings of common liquid application methods for sausage coloring or flavoring. Other objects, features and advantages of the present disclosure will be apparent when the disclosure is considered in conjunction with the images and drawings annexed hereto, which should be construed in an illustrative and not limiting sense.

SUMMARY

In the present disclosure, these objects, as well as others, are achieved with an improved apparatus and method for applying a thin layer of liquid around the circumference of a stream of a sausage meat emulsion by co-extruding the liquid onto an inner surface of a casing at the same time the meat emulsion is extruded into the casing, such that the liquid is applied between the inner surface of the casing and outer surface of the meat emulsion. When applying liquid smoke, the apparatus and method mimic current smoking methods by providing a retail appearance of a typical smoke ring around the perimeter of the sausage, thereby eliminating the need for further smoking treatments, yet the apparatus and method will have a much lower loss of the liquid (i.e., reducing waste) due to the efficiency of applying the liquid inside the casing. The apparatus can also be incorporated into new sausage stuffing machines or easily retrofitted into existing sausage stuffing machines by simply replacing the stuffing horn of an existing sausage stuffing machine with the disclosed apparatus. Therefore, the disclosed apparatus and method reduce consumption of liquids used in sausage production and result in overall financial and environmental savings as well as manufacturing efficiencies.

As used herein, the term "sausage" is intended to have a broad interpretation including cooked and uncooked meats which are formed into a stream of meat (or a meat emulsion) and extruded into or stuffed into a casing.

The term "meat" is also intended to have a broad interpretation as used herein including all types of meat compositions, meat blended with various fillers and enhancers, as well as meat substitutes, such as vegetable proteins.

Further, the term "liquid" in the context of this disclosure is meant to broadly include any type of liquid that would be desirable for reasons of processing efficiency or for reasons relating to the taste, quality or appearance of a sausage, and may be a natural liquid or a liquid formed by diluting a powder having the desired characteristics in water or other type of liquid. Exemplary types of "liquid" include liquid smoke, colorants, flavorants, spices, preservatives, water, and various other products.

In one aspect of the disclosure, the apparatus comprises a collar, a tube end connected within the collar, and a co-axial stuffing tube having a proximal end connected to the tube end. The stuffing tube has concentric inner and outer layers (or tubes) and a longitudinal channel between the inner and outer layers extending from the proximal end of the stuffing tube to a distal end of the stuffing tube. A liquid inlet port is provided in the collar to be in fluid communication with the longitudinal channel in the stuffing tube for channeling a liquid from the inlet port to the distal end of the stuffing tube where it can be co-extruded with the meat emulsion that is extruded from within the inner layer of the stuffing tube. One or more perforations are provided through the outer layer of the stuffing tube proximate the distal end of the stuffing to act as injection ports for the liquid in the longitudinal channel to be extruded therefrom. The inner and outer layers of the stuffing tube are connected together at the distal end of the stuffing tube such that the entire longitudinal channel at the distal end is sealed closed and the liquid in the longitudinal channel is directed through the perforations. In some embodiments, the perforations extend around the periphery of the outer layer.

In another aspect of the disclosure, the apparatus provides a fluid path from the liquid inlet port to the distal end of the stuffing tube. The tube end has a proximal section with a first diameter that is connected to the collar, a distal section of the tube end with a smaller second diameter that is inserted into the proximal end of the stuffing tube, and a tapered section between the proximal section and the distal section. The tube end has a first fluid channel that is in fluid communication with the liquid inlet port in the collar. The first fluid channel extends substantially parallel to a longitudinal axis of the tube end to the distal section of the tube end where the first fluid channel is joined with a second fluid channel that extends substantially perpendicular to the first fluid channel. The second fluid channel extends through at least one edge of the distal section of the tube end to form a coating port where the liquid in the second fluid channel is injected into the longitudinal channel between the concentric inner and outer layers of the stuffing tube.

An entrance to the longitudinal channel at the proximal end of the stuffing tube is formed by the connection of the inner and outer layers of the stuffing tube to the tube end. The inner layer of the stuffing tube is connected to the distal section of the tube end at a first connection point, the outer layer of the stuffing tube is connected to the tapered section of the tube end at a second connection point, and the coating port is positioned between the first connection point and the second connection point to provide fluid communication between the second fluid channel and the longitudinal channel in the stuffing tube.

In other embodiments, the stuffing tube is rotatable along a longitudinal axis thereof. In the apparatus, an internal slip ring is rotatably positioned within the collar and the proximal end of the tube end is connected to an internal portion of the slip ring to provide longitudinal rotation of the stuffing tube relative to the collar.

In yet another aspect of the disclosure, a method is disclosed for co-extruding a thin layer of liquid around a periphery of a stream of meat as the stream of meat is being extruded into a casing. In one method, an existing stuffing horn on an existing sausage stuffing machine is removed and the disclosed apparatus having a co-axial stuffing tube is installed in its place. A liquid is introduced into the liquid inlet port, through a path of one or more canals fluidly connecting the liquid inlet port to the longitudinal channel in the stuffing tube, and extruded through perforations through the outer layer of the stuffing tube proximate the distal end of the stuffing tube such that a thin layer of liquid is formed around a periphery of the stream of meat as the stream of meat is being extruded from within the inner layer of the stuffing tube into the casing.

These and other aspects of the apparatus and method for applying a thin layer of liquid around a stream of meat as it is being stuffed or extruded into a casing will be better understood upon review of the detailed description and the accompanying drawings.

BRIEF DESCRIPTION OF THE DRAWINGS

The features, functions and advantages discussed herein may be achieved independently in various embodiments or may be combined in yet other embodiments. Various embodiments will be hereinafter described with reference to the following drawings for the purpose of illustrating the above-described and other aspects.

FIG. 2 is a diagram representing a top view of the stuffing apparatus shown in FIG. 1.

FIG. 3 is a diagram representing a horizontal cross-sectional view of the stuffing apparatus taken along taken along the lines 3-3 in FIG. 2.

FIG. 4 is a diagram representing a top view of a stuffing tube for use in the apparatus of FIG. 1.

FIG. 5 is a diagram representing a horizontal cross-sectional view of the stuffing tube taken along the lines 5-5 in FIG. 4.

Reference will hereinafter be made to the drawings in which similar elements in different drawings bear the same reference numerals.

DETAILED DESCRIPTION

For illustration purposes, apparatus and methods for applying a thin layer of liquid around a stream of meat as it is being stuffed or extruded into a casing will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The disclosed apparatus is designed for quick and easy integration into any type of existing sausage extrusion and stuffing equipment, such as those available from Townsend Engineering Company, Hitek Food Equipment, Inc., Vemag Maschinenbau GmbH, and Handtmann Inc., or any of these or other sausage extrusion and stuffing equipment may be manufactured and sold with the disclosed apparatus. For example, a stuffing horn on an existing sausage stuffing machine is removed and the disclosed apparatus having a co-axial stuffing tube is installed in its place. In typical sausage extrusion and stuffing equipment, the stuffing horn has a stuffing tube made from a single layer with a single diameter and may be adapted to reciprocally move between a stuffing position and a retracted position by a rod connected to an air cylinder. In other known sausage stuffing equipment, the stuffing tube does not move horizontally back and forth; instead, the stuffing tube rotates into position.

Figure 1:
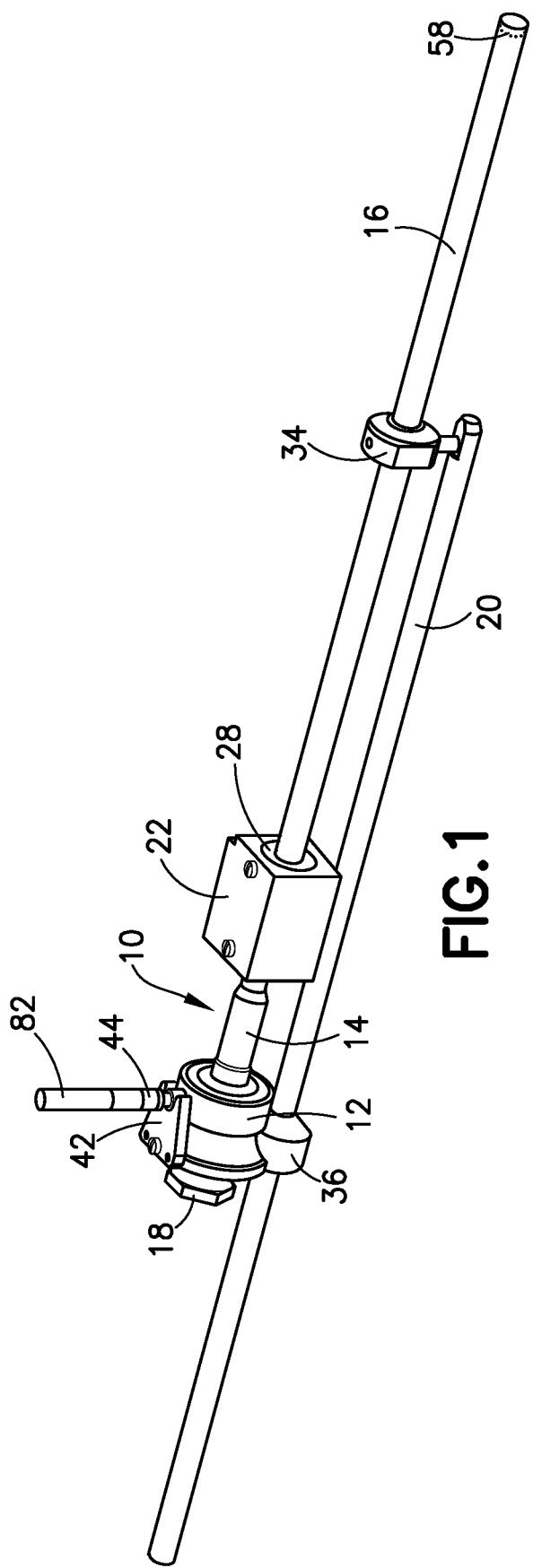
FIG. 1 is a diagram representing a perspective view of a stuffing apparatus for applying a thin layer of liquid around the circumference of a stream of meet as it is being stuffed or extruded into a casing.

Referring to the drawings, FIGS. 1-3 illustrate a stuffing apparatus 10 installed in a typical sausage stuffing machine (not shown) and related mechanical parts that replace or couple with the original manufactured parts on known sausage stuffing machines. The stuffing apparatus 10 includes a collar 12, a tube end 14, and a co-axial stuffing tube 16 having an inner layer 30 and an outer layer 32 (described in more detail below). The collar 12, tube end 14, and stuffing tube 16 may be manufactured as separate parts that are connected together or may be manufactured as unitary part. The stuffing apparatus 10 is designed for easy coupling of the stuffing apparatus 10 to a standard tube coupling assembly 18 and standard follower assembly 20, and for use with a standard stuffing tube feed block 22 where a meat emulsion or stream of meat is introduced into the stuffing tube 16 through an aperture 26 in the stuffing tube 10. During use in some sausage stuffing equipment, the stuffing tube 16 is moved horizontally back and forth along the follower assembly 20 to permit additional casings to be fitted around the stuffing tube 16 and also rotates about a longitudinal axis 24 of the stuffing tube 16 to prevent the casing from breaking or tearing. In other sausage stuffing equipment, the stuffing tube 16 does not rotate.

During installation of the stuffing apparatus 10, the stuffing tube 16 is positioned through the feed block 22 and a guide bushing 34, which is coupled to follower assembly 20. A block bushing 28 for the feed block 22 and the guide bushing 34 may be original parts as included with known sausage stuffing machines, or the block bushing 28 and guide bushing 34 may be designed with a size to accommodate a slightly larger diameter of the co-axial stuffing tube 16. When retro-fitting the stuffing apparatus 10 to a known sausage stuffing machine, it is desirable to maintain an inner diameter of the inner layer 30 to be about the same as the single diameter of the standard single layer stuffing tube that was replaced so that there is a sufficient space for the meat emulsion to be extruded without restriction and without effecting other processing parameters of the known sausage stuffing equipment or processing efficiencies. But, the outer diameter of the outer layer 32 may be slightly larger than the outer diameter of the standard single layer stuffing tube. In that instance, the block bushing 28 and guide bushing 34 are designed with a larger inner diameter. The collar 12 of the stuffing apparatus 10 is coupled to a slider 36 having a central aperture through which the follower assembly 20 slides, which together with the guide bushing 34 permits the stuffing apparatus 10 to move in a horizontal direction along the follower assembly 20 and maintains the stuffing apparatus 10 in proper position in the sausage stuffing machine.

FIGS. 4-8D show further details of the stuffing apparatus 10. The collar 12 of the stuffing apparatus 10 is a stationary element in the sense that it does not rotate. The collar 12 is retained in a stationary position by a retainer 42, which is positioned about a liquid inlet port 44 of the collar 12 (see FIG. 1), to prevent the collar 12 from rotating. The collar 12 is maintained in a position above the follower assembly 20 by the guide bushing 34 and stuffing tube 16.

A proximal section 38 of the tube end 14 has a first diameter and is connected within the collar 12. The connection between the tube end 14 and the collar 12 can be static in the sense that it does not permit the tube end 14 to rotate within the collar 12. Alternatively, an internal slip ring 40 may be rotatably positioned within the collar 12 and the proximal section 38 of the tube end 14 is connected to the internal slip ring 40 to permit rotation of the tube end 14 and the stuffing tube 16 relative to the collar 12 and about the longitudinal axis 24 of the stuffing tube 16 and the tube end 14. The tube end 14 further comprises a distal section 48 with a second diameter that is smaller than the first diameter of the proximal section 38 and a tapered section 50 between the proximal section 38 and the distal section 48. The distal section 48 of the tube end 14 is connected to a proximal end 46 of the stuffing tube 16.

Figure 6:
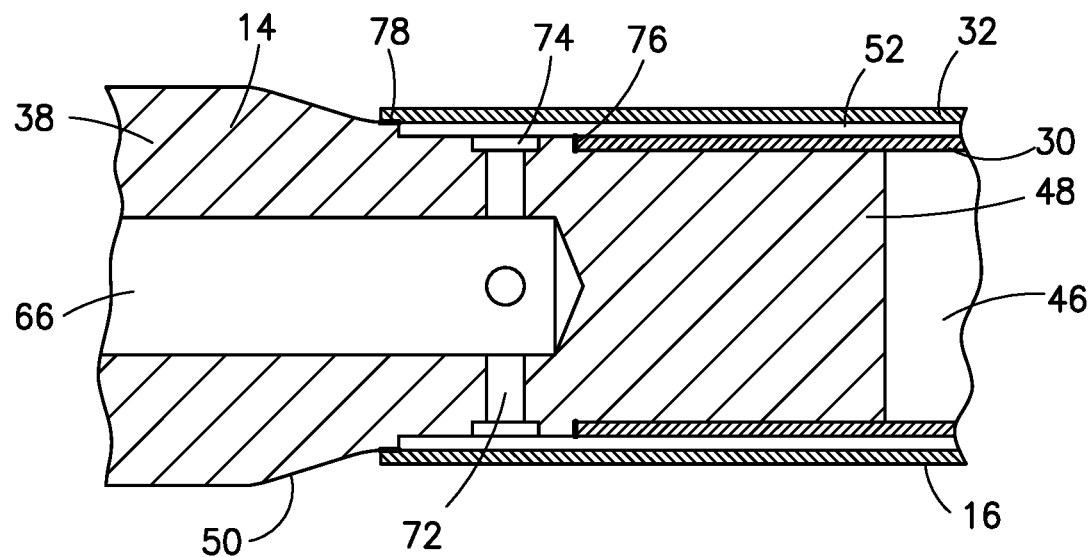
FIG. 6 is a diagram representing an enlarged horizontal cross-sectional view of the proximal end of the stuffing tube shown in FIG. 5.
Figure 7:
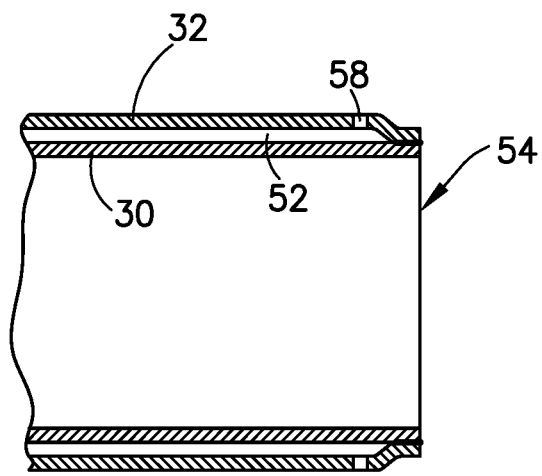
FIG. 7 is a diagram representing an enlarged horizontal cross-sectional view of the distal end of the stuffing tube.

The stuffing tube 16 is a co-axial tube having a concentric inner layer 30 and outer layer 32 with a space therebetween to provide a longitudinal channel 52 extending around the periphery of the stuffing tube 16 between the inner 30 and outer 32 layers from a proximal end 46 to a distal end 54 of the stuffing tube 16. See FIGS. 6 and 7 showing an enlarged view of the stuffing tube 16. The longitudinal channel 52 provides a separate path for a liquid to travel along the stuffing tube 16 with a meat emulsion so the liquid can be co-extruded with the meat emulsion into a casing at the distal end 54 of the stuffing tube 16. The co-axial double layer structure of the stuffing tube 16 allows the central space 56 interior of the inner layer 30 to distribute the meat emulsion into the sausage casing while allowing the longitudinal channel 52 between the inner layer 30 and outer layer 32 to coat an inner surface of the casing during the stuffing process, thus co-extruding a thin layer of liquid around a periphery of a stream of meat as the stream is being extruded into the casing. It further prevents the liquid from interacting with the stream of meat prior to extrusion into the casing.

The radial space between the inner layer 30 and the outer layer 32 in the longitudinal channel 52 is preferably kept to a minimum in order to maintain the diameter of the outer layer 32 so it can be used with existing sausage stuffing machines without major modifications and without restricting the flow of the stream of meat. The stuffing tube 16 comprises an aperture 26 through the inner layer 30 and outer layer 32 that functions as a meat inlet port. The aperture 26 is positioned downstream from the distal section 48 of the tube end 14 and is surrounded by a seal 62 between the inner layer 30 and the outer layer 32 that prevents the stream of meat from entering the longitudinal channel 52 between the inner layer 30 and the outer layer 32. The seal 62 may be formed by laser welding or other known methods for providing a liquid-tight seal between two metallic components.

The inner layer 30 and the outer layer 32 of the stuffing tube 16 are also sealed at the distal end 54 of the stuffing tube 16 via laser welding or other methods to provide an end seal 64 that is liquid-tight and closes off the entire longitudinal channel 52 around the circumference of the stuffing tube 16 at the distal end 54. See FIG. 7. One or more perforations 58 through the outer layer 32 of the stuffing tube 16 are positioned proximate to the distal end 54 of the stuffing tube 16 to act as one or more injection nozzles that permit the liquid being pumped into the longitudinal channel 52 to be co-extruded from the stuffing tube 16 with the stream of meat as the stream of meat is extruded from the stuffing tube 16 into the casing and to disburse and coat the inner surface of the casing during sausage stuffing process. Because the longitudinal channel 52 is sealed off at the distal end 54 of the stuffing tube 16, the liquid in the longitudinal channel is directed through the perforations 58.

Figure 8A:
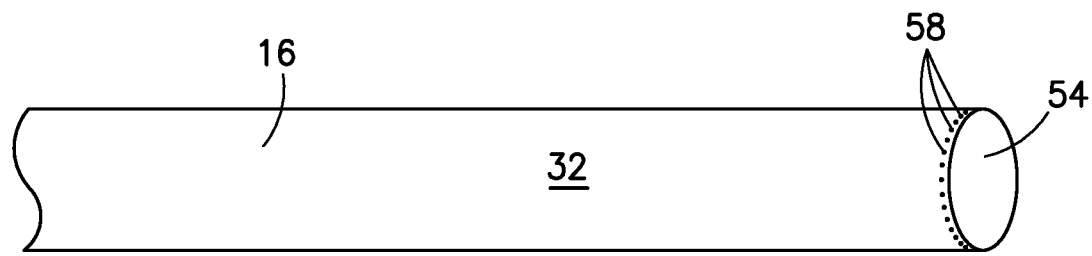
FIGS. 8A-8D are diagrams representing the distal end of a stuffing tube in accordance with this disclosure with alternative arrangements of perforations.
Figure 8B:
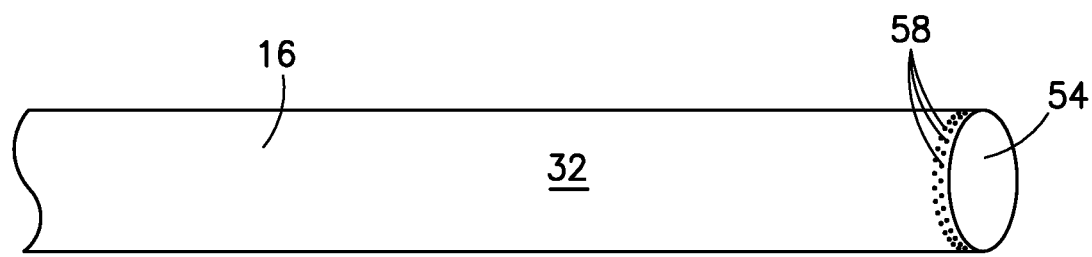
Figure 8C:
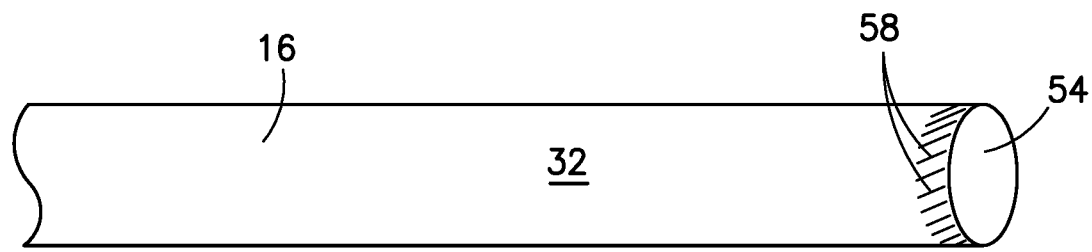
Figure 8D:
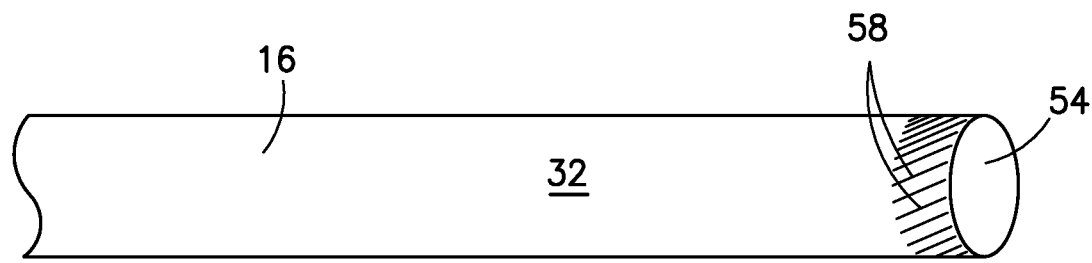

In some embodiments, a plurality of perforations 58 extend around the periphery of the outer layer 32 of the stuffing tube 16 in one or more rows positioned about 0.01 cm to 12 inches, preferably less than 6 inches, from the distal end 54. The perforations 58 may have a circular shape having a diameter between 0.01 cm to about 20 cm or may be in the form of stars, slots or other elongated shapes positioned either perpendicular to the distal end 54 or at less than 90 degrees relative to the distal end 54 and having a length between 0.01 cm to about 12 cm. FIGS. 8A-8D show four exemplary arrangements of perforations 58 around the periphery of a distal end 54 of the stuffing tube 16. FIG. 8A shows a single row of perforations 58 evenly spaced around the periphery of the stuffing tube 16. FIG. 8B shows two rows of perforations 58, the perforations 58 in a first of the two rows being offset from the perforations 58 in a second of the two rows. FIGS. 8C and 8D show two exemplary arrangements of slots 60 positioned around the periphery of the distal end 54 of the stuffing tube 16. The slots 60 are positioned to extend at an angle less than 90 degrees relative to the distal end. Other arrangements of perforations 58 or slots 60 may be used.

Referring again to FIGS. 4 and 5, and more particularly to FIG. 6, the proximal end 46 of the stuffing tube 16 is connected to the distal section 48 of the tube end 14 in a manner that provides for fluid communication between the liquid inlet port 44 in the collar 12 and the longitudinal channel 52 in the stuffing tube 16. The tube end 14 provides a fluid path to connect the liquid inlet port 44 and the longitudinal channel 52. The fluid path includes a first fluid channel 66 that is in fluid communication with the liquid inlet port 44 in the collar 12 through an inlet channel 68. The first fluid channel 66 is positioned substantially parallel to a longitudinal axis 24 of the tube end 14 and the stuffing tube 16 and extends to the distal section 48 of the tube end 14 where the first fluid channel 66 is joined with a second fluid channel 72 positioned substantially perpendicular to the first fluid channel 66. The second fluid channel 72 extends through the surface of the distal section 48 of the tube end 14 to form a coating port 74 where the liquid in the second fluid channel 72 is injected into the longitudinal channel 52 between the concentric inner layer 30 and outer layer 32 of the stuffing tube 16.

An entrance to the longitudinal channel 52 at the proximal end 46 of the stuffing tube 16 is formed by the connection of the inner layer 30 and outer layer 32 of the stuffing tube 16 to the tube end 14. The distal section 48 of the tube end 14 is inserted into proximal end 46 of the stuffing tube. The inner layer 30 of the stuffing tube 16 is connected to the distal section 48 of the tube end 14 at a first connection point 76, the outer layer 32 of the stuffing tube 16 is connected to the tapered section 50 of the tube end 14 at a second connection point 78, and the coating port 74 in the surface of the tube end 14 is positioned between the first connection point 76 and the second connection point 78 to provide fluid communication between the second fluid channel 72 and the longitudinal channel 52 in the stuffing tube 16. The connections can be made by laser welding or other methods for sealing two metal parts to be liquid-tight. The connection of the inner layer 30 and the outer layer 32 of the stuffing tube 16 to the tube end 14 allows liquid to distribute around the stuffing tube 16 and flow to the distal end 54.

Figure 9:
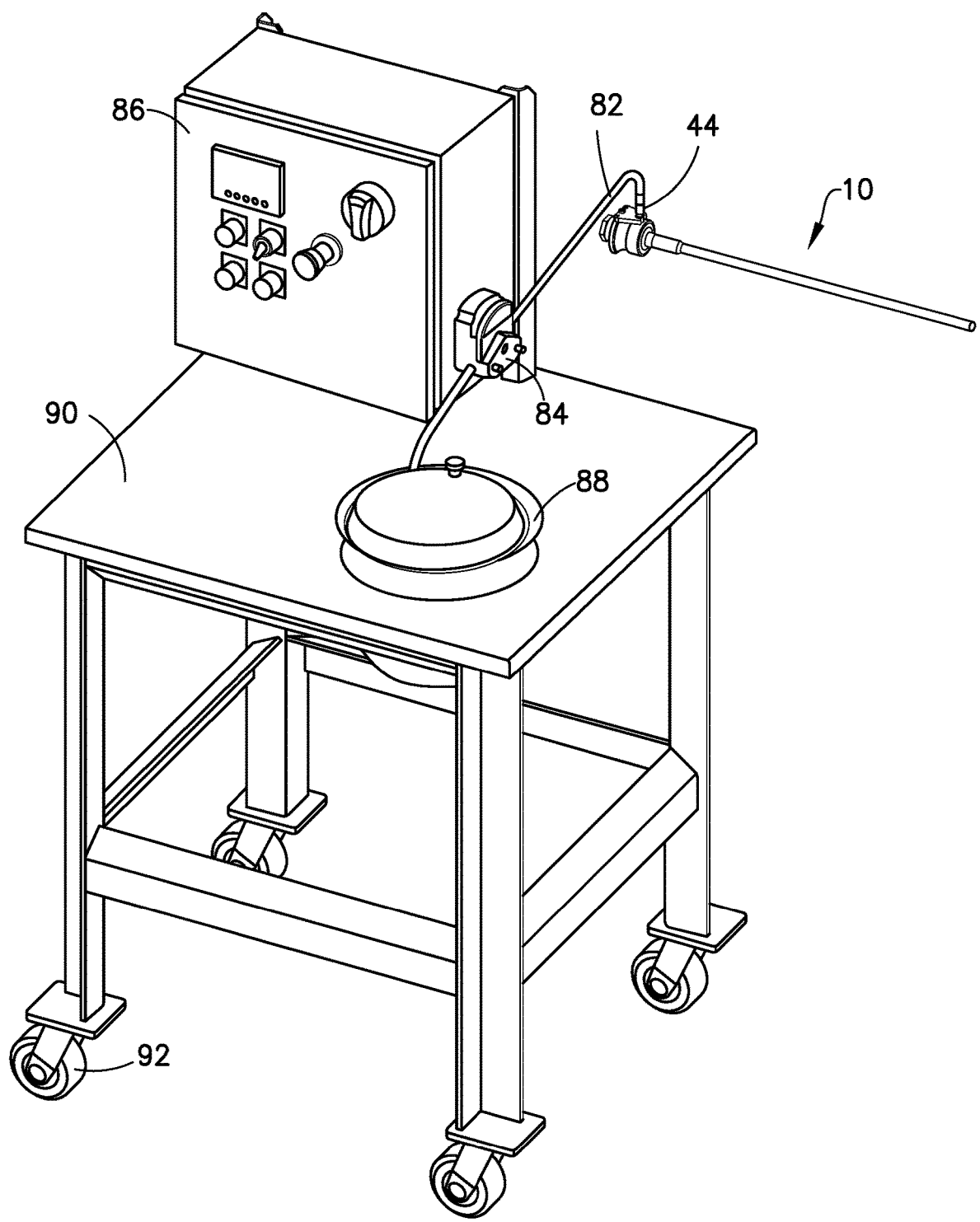
FIG. 9 is a diagram representing a portable system for using the stuffing apparatus shown in FIG. 1.

When assembled, the liquid inlet port 44 allows liquid to be injected through the collar 12 and the tube end 14 and into the longitudinal channel 52 between the inner layer 30 and the outer layer 32 of the stuffing tube 16. The liquid inlet port 44 and the collar 12 are maintained in a stationary position by the retainer 42, which is connected to the tube coupling assembly 18 (i.e., the retainer 42 prevents the liquid inlet port 44 and the collar 12 from rotating). See FIG. 1. Referring to FIG. 5, the liquid inlet port 44 is formed with an external supply fitting 80 (for example in the form of a male Luer connector for easy coupling with a female Luer connector). Referring to FIG. 9, liquid is delivered to the liquid inlet port 44 through a feed hose 82 (which for example has a female Luer connector for easy coupling to the male Luer connector of the external supply fitting 80). The amount of liquid delivered to the liquid inlet port 44 may be controlled by a pump, a metering device (such as metering pump 84) and a control system 86 having valves for controlling the volume of liquid, the flow rate of liquid and the pressure of the liquid. The metering pump 84, control system 86 and a covered reservoir 88 for the liquid may be provided on a movable platform 90 with casters 92 to facilitate use with an existing sausage making machine. Alternatively, an upright stand may be used to hold the metering pump 84, control system 86 and reservoir 88. The feed hose 82 may be any type of flexible tubing for supplying a liquid. The metering pump 84 may be any type of pump capable of metering the rate, flow and/or pressure of a liquid, for example, a peristaltic metering pump with forward and reverse control may be used.

In use, when installed into an existing sausage stuffing machine, liquid will leave the reservoir 88 through the feed hose 82 and passes through the metering pump 84, which observes the volume and flow rate of the liquid and works together with the control system 86 to control the volume and flow rate of the liquid. The liquid continues through the feed hose 82 to the liquid inlet port 44 of the collar 12 in the stuffing apparatus 10. The liquid then continues through the inlet channel 68 to the first fluid channel 66 in the tube end 14. Then, the liquid continues to the second fluid channel 72 past the coating port 74 at the surface of the distal section 48 of the tube end 14 and into the longitudinal channel 52 in the stuffing tube 16. The liquid is distributed around the periphery of the stuffing tube 16 between the inner layer 30 and the outer layer 32 of the stuffing tube 16. At the same time, a meat emulsion is pumped into the central space 56 within the inner layer 30 of the stuffing tube 16 through the aperture 26 (i.e., the meat inlet port) in the stuffing tube 16. The seal 62 around the aperture 26 between the inner layer 30 and the outer layer 32 prevents the meat emulsion and the liquid from mixing in the stuffing tube 16. A casing for sausage (not shown) is generally placed over the distal end 54 of the stuffing tube 16 to accept the meat emulsion as it is extruded from the central space 56 as is known in the art. The stuffing apparatus 10 provides for liquid distributed around the periphery of the stuffing tube 16 within the longitudinal channel 52 to be co-extruded into the casing at the same time the meat emulsion is extruded into the casing via the perforations 58 through the outer layer 32 proximate the distal end 54 of the stuffing tube 16, which coat the inner surface of the casing as the meat emulsion is extruded into the casing.

Methods are also disclosed for co-extruding a thin layer of liquid around a periphery of a stream of meat as the stream of meat is being extruded into a casing. In a first method for making sausage, the steps include co-extruding a stream of meat from a central space 56 inside an inner layer 30 of a co-axial stuffing tube 16 while at the same time extruding a liquid from a longitudinal channel 52 between the inner layer 30 and an outer layer 32 of the stuffing tube 16 through perforations 58 in the outer layer 32 proximate a distal end 54 of the stuffing tube 16. In another method for retrofitting an existing sausage making machine, the steps include removing an existing stuffing horn on an existing sausage stuffing machine, and installing a double-walled stuffing horn (i.e., the stuffing apparatus 10) in place of the existing stuffing horn into the existing sausage stuffing machine, and then co-extruding a stream of meat from a central space 56 inside an inner layer 30 of the double-walled stuffing horn (or co-axial stuffing tube 16) while at the same time extruding a liquid from a longitudinal channel 52 between the inner layer 30 and an outer layer 32 of the double-walled stuffing horn through perforations 58 in the outer layer 32 proximate a distal end 54 of the stuffing horn. Additional steps of this method include removing a locking collar in the existing sausage stuffing machine, replacing a retainer ring on the tube coupling assembly 18, and repositioning a limit switch on a cylinder in the existing sausage stuffing machine to create sufficient space to accommodate the double-walled stuffing horn. In the methods, the stuffing apparatus 10 may be used with standard parts of sausage stuffing machines, such as the feed block 22 and follower assembly 20, with slight modification to accommodate the increased diameter of the co-axial stuffing tube 16.

Although the improved liquid application method and apparatus of this disclosure has been explained in relation to preferred embodiments, it is to be understood that many other possible modifications and variations can be made without departing from the spirit and scope of the disclosure. For example, and without limitation, the perforations 58 may be configured in any shape, size and arrangement that permits an appropriate flow of liquid to be extruded at the distal end 54 of the stuffing tube 16. The metering pump and control system can be combined into a single unit, and the volume and flow rate of the liquid can be adjusted depending on the viscosity of the fluid and desired taste or appearance characteristics for the sausage. It is intended that all such modifications and variations be considered as within the spirit and scope of this disclosure, as defined in the following claims.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatively unless the claim language explicitly states a condition that precludes such an interpretation.

We claim:

1. An apparatus for co-extruding a thin layer of liquid around a periphery of a stream of meat as the stream of meat is being extruded into a casing, the apparatus comprising:
    a tube end;
    a co-axial stuffing tube having a proximal end connected to the tube end, the stuffing tube having concentric inner and outer layers and a longitudinal channel between the inner and outer layers extending from the proximal end of the stuffing tube to a distal end of the stuffing tube; and
    a liquid inlet port and injection nozzles in fluid communication with the longitudinal channel in the stuffing tube, the injection nozzles positioned proximate the distal end of the stuffing tube to permit a liquid in the longitudinal channel to be co-extruded from the stuffing tube with the stream of meat as the stream of meat is extruded from the stuffing tube into the casing.

2. The apparatus of claim 1, wherein the injection nozzles comprise perforations through the outer layer of the stuffing tube proximate the distal end.

3. The apparatus of claim 2, wherein the perforations extend around the periphery of the outer layer.

4. The apparatus of claim 2, wherein the inner and outer layers of the stuffing tube are connected together at the distal end of the stuffing tube such that the entire longitudinal channel at the distal end is sealed closed and the liquid in the longitudinal channel is directed through the perforations.

5. The apparatus of claim 1, wherein the tube end has a proximal section with a first diameter, a distal section with a smaller second diameter that is inserted into the proximal end of the stuffing tube, and a tapered section between the proximal section and the distal section, the tube end further comprising a first fluid channel in fluid communication with the liquid inlet port, the first fluid channel extending substantially parallel to a longitudinal axis of the tube end to the distal section of the tube end where the first fluid channel is joined with a second fluid channel extending substantially perpendicular to the first fluid channel and through a surface of the distal section of the tube end to form a coating port.

6. The apparatus of claim 5, wherein the inner layer of the stuffing tube is connected to the distal section at a first connection point, the outer layer of the stuffing tube is connected to the tapered section at a second connection point, and the coating port is between the first connection point and the second connection point to provide fluid communication between the second fluid channel and the longitudinal channel in the stuffing tube.

7. The apparatus of claim 1, further comprising a collar having an internal slip ring that is rotatably positioned within the collar, and the proximal end of the stuffing tube is connected to an internal portion of the slip ring to provide longitudinal rotation of the stuffing tube relative to the collar.

8. The apparatus of claim 7, wherein the liquid inlet port is positioned in the collar, the apparatus further comprising a retainer positioned about the liquid inlet port to prevent the liquid inlet port and the collar from rotating.

9. The apparatus of claim 1, further comprising a meat inlet port through the inner and outer layers of the stuffing tube positioned downstream from the distal section of the tube end, the meat inlet port surrounded by a seal between the inner and outer layers of the stuffing tube that prevents the stream of meat from entering the longitudinal channel between the inner and outer layers.

10. The apparatus of claim 1, further comprising a pump, a metering device and a control system having valves that control a volume and flow rate of the liquid in the longitudinal channel.

11. The apparatus of claim 10, wherein the pump, the metering device and the control system are provided on a movable platform to facilitate use with an existing sausage making machine.

12. The apparatus of claim 10, wherein the pump, the metering device and the control system are incorporated into an existing sausage making machine.

13. The apparatus of claim 1, wherein the injection nozzles comprise slots through the outer layer of the stuffing tube proximate the distal end.

14. The apparatus of claim 13, wherein the slots extend around the periphery of the outer layer.

15. A co-axial stuffing tube for co-extruding a thin layer of liquid around a periphery of a stream of meat as the stream of meat is being extruded into a casing, the stuffing tube comprising:
    concentric inner and outer layers and a longitudinal channel between the inner and outer layers extending from a proximal end of the stuffing tube to a distal end of the stuffing tube;
    a liquid inlet port in fluid communication with the longitudinal channel in the stuffing tube; and
    perforations through the outer layer of the stuffing tube proximate the distal end that permit a liquid in the longitudinal channel to be co-extruded from the stuffing tube with the stream of meat as the stream of meat is extruded from the stuffing tube into the casing.

16. The co-axial stuffing tube of claim 15, wherein the perforations extend around the periphery of the outer layer.

17. The co-axial stuffing tube of claim 15, wherein the inner and outer layers of the stuffing tube are connected together at the distal end of the stuffing tube such that the entire longitudinal channel is sealed closed at the distal end and the liquid in the longitudinal channel is directed through the perforations.

18. The co-axial stuffing tube of claim 3, further comprising a meat inlet port through the inner and outer layers of the stuffing tube positioned downstream from the distal section of the tube end, the meat inlet port surrounded by a seal between the inner and outer layers of the stuffing tube that prevents the stream of meat from entering the longitudinal channel between the inner and outer layers.

19. An apparatus for co-extruding a thin layer of liquid around a periphery of a stream of meat as the stream of meat is being extruded into a casing, the apparatus comprising:
  a tube end;
  a co-axial stuffing tube having a proximal end connected to the tube end, the stuffing tube having concentric inner and outer layers and a longitudinal channel between the inner and outer layers extending from the proximal end of the stuffing tube to a distal end of the stuffing tube; and
  a liquid inlet port in fluid communication with the longitudinal channel in the stuffing tube,
  the tube end having a proximal section with a first diameter, a distal section with a smaller second diameter that is inserted into the proximal end of the stuffing tube, and a tapered section between the proximal section and the distal section, the tube end further comprising a first fluid channel in fluid communication with the liquid inlet port, the first fluid channel extending substantially parallel to a longitudinal axis of the tube end to the distal section of the tube end where the first fluid channel is joined with a second fluid channel extending substantially perpendicular to the first fluid channel and through a surface of the distal section of the tube end to form a coating port.

20. The apparatus of claim 19, further comprising perforations through the outer layer of the stuffing tube proximate the distal end that permit the liquid in the longitudinal channel to be co-extruded from the stuffing tube with the stream of meat as the stream of meat is extruded from the stuffing tube into the casing.

21. The apparatus of claim 19, wherein the inner layer of the stuffing tube is connected to the distal section at a first connection point, the outer layer of the stuffing tube is connected to the tapered section at a second connection point, and the coating port is between the first connection point and the second connection point to provide fluid communication between the second fluid channel and the longitudinal channel in the stuffing tube.

* * * * *